United States Patent
Ocker

[15] 3,682,086
[45] Aug. 8, 1972

[54] DEVICE FOR PRODUCING A MASS OF CHOCOLATE

[72] Inventor: Herbert Ocker, Leonberg, Germany

[73] Assignee: Werner & Pfleiderer, Stuttgart-Feuerbach, Germany

[22] Filed: Nov. 18, 1970

[21] Appl. No.: 90,621

Related U.S. Application Data

[62] Division of Ser. No. 731,483, May 23, 1968, abandoned.

[52] U.S. Cl. ............................................. 99/236 CC
[51] Int. Cl. ............................................. A23g 1/10
[58] Field of Search..99/236 CC, 236 R, 23, 26, 134; 259/6, 21, 41, 95–96, 104

[56] References Cited

UNITED STATES PATENTS

| | | |
|---|---|---|
| 1,591,979 | 7/1926 | Iff.................................99/23 |
| 2,004,009 | 6/1935 | Moir..............................99/23 |
| 2,070,558 | 2/1937 | Beck..................99/236 CC X |
| 2,670,188 | 2/1954 | Erdmenger................259/104 |
| 2,711,964 | 6/1955 | Wiemer................99/236 CC |
| 3,140,860 | 7/1964 | McConnaughay.......259/95 X |
| 3,215,192 | 11/1965 | Sollich...............99/236 CC X |
| 3,285,582 | 11/1966 | Hubner..............99/236 CC X |
| 3,357,836 | 12/1967 | Beetz............................99/23 |
| 3,390,004 | 6/1968 | Di Placido................259/96 X |

*Primary Examiner*—Walter A. Scheel
*Assistant Examiner*—Arthur O. Henderson
*Attorney*—Hane, Baxley & Spiecens

[57] ABSTRACT

A device for producing a mass of chocolate in continuous operation in which the starting ingredients for producing the mass of chocolate are first fed to a mixing and kneading device. The mixture produced in the device is then fed to directly coupled liquefying means for liquefying the mixture which is finally fed to a multiple worm conveyor in which the liquefied mixture is conveyed between and along the worms of the conveyor to effect enriching or refining and deliquefying or dehydration of the mixture. Degasifying means are associated with the conveyor for degasifying the mixture while passing between and along the worms of the conveyor.

8 Claims, 4 Drawing Figures

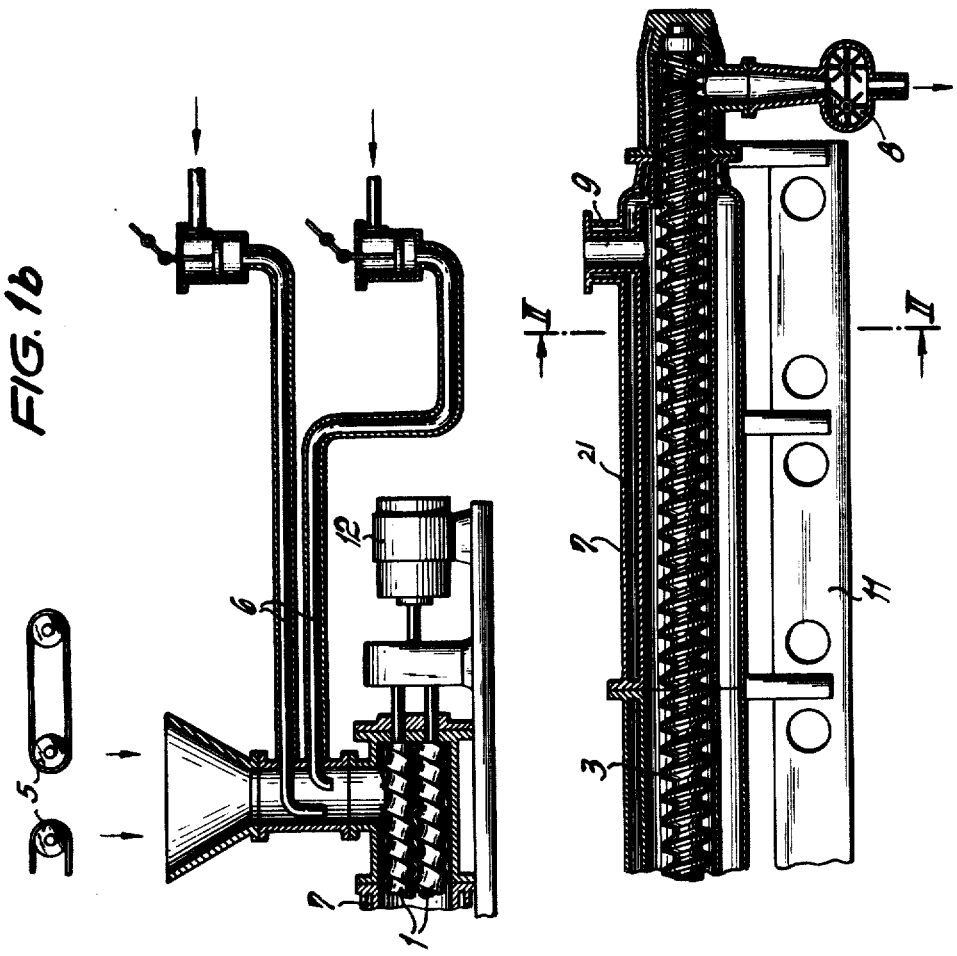

INVENTOR
HERBERT OCKER
BY Hane, Baxley
and Spiecens
ATTORNEYS

DEVICE FOR PRODUCING A MASS OF CHOCOLATE

The present application is a division of my copending application Ser. No. 731,483, filed May 23, 1968, now abandoned.

The invention relates to a device for producing a mass of chocolate.

There are known devices for producing a mass of chocolate in which mixers or the more economical continually operating kneading and mixing devices such as two-shaft disc kneaders or worm conveyors are used for the first mixing and kneading operation. The required ingredients such as cocoa, milk powder, sugar, cocoa butter are fed after preliminary and conventional processing of the same, to the kneading and mixing device in accurately dosed or metered quantities. Continually operating devices of this kind can be generally heated or cooled. This first operational step yields a uniform starting mixture containing the ingredients proportioned in accordance with the selected recipe. It is also possible to extract certain undesirable admixtures from the mass during the first mixing and kneading operation.

The starting mixture is then fed to a rolling device such as a five-roll device. The purpose of rolling the mixture is to obtain the required grain fineness and also an intimate binding of the cocoa and the sugar. The rolling device includes coarse rolls and fine rolls; a worm conveyor must be interposed between the coarse rolls and the fine rolls to restore the rollability of the mixture. Unless such intermediate worm conveyor is used, it is necessary to let the mixture rest for about 24 hours at about 50°C to restore rollability thereof as the mixture becomes more or less powderlike due to the rolling pressure and the resulting increase in surface. Obviously, resting of the mass for about 24 hours seriously interferes with the continuous manufacturing operation and, hence, increases the costs of the operation.

Finally, the mixture of chocolate reaches the conching or tumbling stage. Refining of the mixture is effected in conches or tumbling devices. Many suitable types of conches are well known in the market. In the conches, the mixture is continuously agitated or tumbled while being subjected to heat. The conching operation takes about 30 to 80 hours.

The purpose of the conching or tumbling operation is to give the mass of the mixture a plasticized or salve-like consistency and moreover, to effect the absolutely necessary deliquefication or dehydration of the mass. It further effects a "rounding-off" of the fine cocoa and sugar crystals and volatilization of undesirable aroma essences.

The conching or tumbling operation also serves to obtain a low viscosity consistency of the mass of chocolate which is necessary for the following processing, such as shaping of the mass to chocolate bars, etc. Lowering of the viscosity is effected by dehydration of the mass during conching as each withdrawal of one-tenth of a percent of water represents an increase of 1 percent of cocoa butter and thus a correspondingly even lower viscosity. The water content must be reduced from two to four percent to not more than one percent of the rolled mass, or even to not more than one-half percent.

Producing chocolate by the afore-referred to device is highly time consuming and entails a heavy electric power consumption; it also requires a large investment for the required installation. To reduce the overall costs of the manufacture of chocolate, it has been proposed finely to granulate the raw materials prior to the mixing of the chocolate ingredients to obtain the starting mixture. The ingredients are fed in proportions as required by the selected recipe by means of a suitable and conventional metering or dosing device such as a band type dosing device to a gas jet mill or pump in which all the ingredients are granulated simultaneously. The resulting light fraction or accepts are separated in a cyclone separator and mixed in a continuously operating mixing and kneading device with liquid cocoa butter. The heavy fraction or rejects are returned to the jet mill. Nitrogen may be used as carrier gas in the jet mill and the separator. The mass after leaving the mixing and kneading device is immediately subjected to an upgrading or refining operation. Refining or upgrading is effected by ultrasonic waves generated by high frequency tube generators by pumping the mass past an ultrasonic wave head.

Conches and rolling devices are thus eliminated. However, the savings obtained by means of the previously described device are set off by significant disadvantages. A jet mill operates free of trouble only if the fat content of the material to be granulated does not exceed a definite rather low percentage. Accordingly, the mill must be charged with comparatively fat poor cocoa raw material which must be first worked in an additionally continuously operating worm press. The cocoa butter obtained by such preliminary working of the raw material is later on returned to the mass while the same is in the kneading device. Furthermore, jet mills have a high power consumption. Moreover, the very important dehydration of the mass does not adequately occur during the refining of the mass as effected by exposure to ultrasonic waves. Exposure to ultrasonic waves merely generates, in rapid sequence, pressure and pull tensions in the mass. Moreover, active oxygen is formed to a certain extent. Refining by exposure to ultrasonic waves permits working only with small surfaces. This entails that a rather high vacuum must be used to obtain an appreciable dehydration. The use of a high vacuum is not only fairly expensive but it also causes a loss of a substantial part of desirable aroma essences.

It is a broad object of the invention to retain the advantages of the aforedescribed conventional devices but to avoid the disadvantages thereof.

A more specific object of the invention is to provide a novel and improved device for producing a mass of chocolate which eliminates the use of expensive rolling devices and conches following the initial mixing and kneading operation thereby considerably reducing the overall production costs and also accelerating the completion of the production, and which furthermore assures an entirely sufficient dehydration of the mass of chocolate while maintaining the pleasant, that is, desirable aroma essences and effecting a smooth, that is, salve-like consistency of the mass. Elimination of the conches which do not continually operate, permits continuous operation. Moreover, elimination of the conches results in considerable savings since customarily a substantial number of conches is associated with each mixing and kneading device and the energy consumption of each conche is high.

The aforepointed out objects, features and advantages and other objects, features and advantages which will be pointed out hereinafter are obtained by producing a mass of chocolate in which the first operation, namely, mixing and kneading conventional chocolate mass ingredients proportioned in accordance with the selected recipe to obtain an intimate and substantially homogenous mixture is immediately and directly followed by a liquefying operation. The liquefied mixture is thereupon subjected to a combined refining, dehydration, and degasifying operation. The mass thus treated can be directly fed into a storage silo or other receptacle, or be directly further processed. No further rolling or conching operations are necessary.

According to a particularly advantageous aspect of the invention, the liquefied mass is continually and in finely distributed form conveyed between and along at least two coacting worms and while being so conveyed is degasified and dehydrated. It has been found to be particularly advantageous to use meshing worms. To effect an especially smooth dehydration, the operation can be carried out under vacuum. The vacuum should be a low vacuum to prevent loss of valuable aroma essences.

A device according to the invention comprises a worm type mixing and kneading device directly followed by dehydration device which, in turn, is followed by a multiple-shaft worm type conveying device including means for degasifying the mass.

According to the invention degasifying may be effected by equipping the casing of the conveying device with one or several studs or ports communicating with the interior of the casing for withdrawing freed gases therefrom or by securing on the casing a dome extending across the entire length of the worms in the conveying device and connected with the interior of the device through a stud or port.

In the accompanying drawing several preferred embodiments of the invention are shown by way of illustration and not by way of limitation.

In the drawing:

FIGS. 1a and 1b are a composite diagrammatic view, partly in section, of a device according to the invention, FIG. 1a being the left-hand end of the device and FIG. 1b the right-hand end in partial overlap;

Figure 1A:
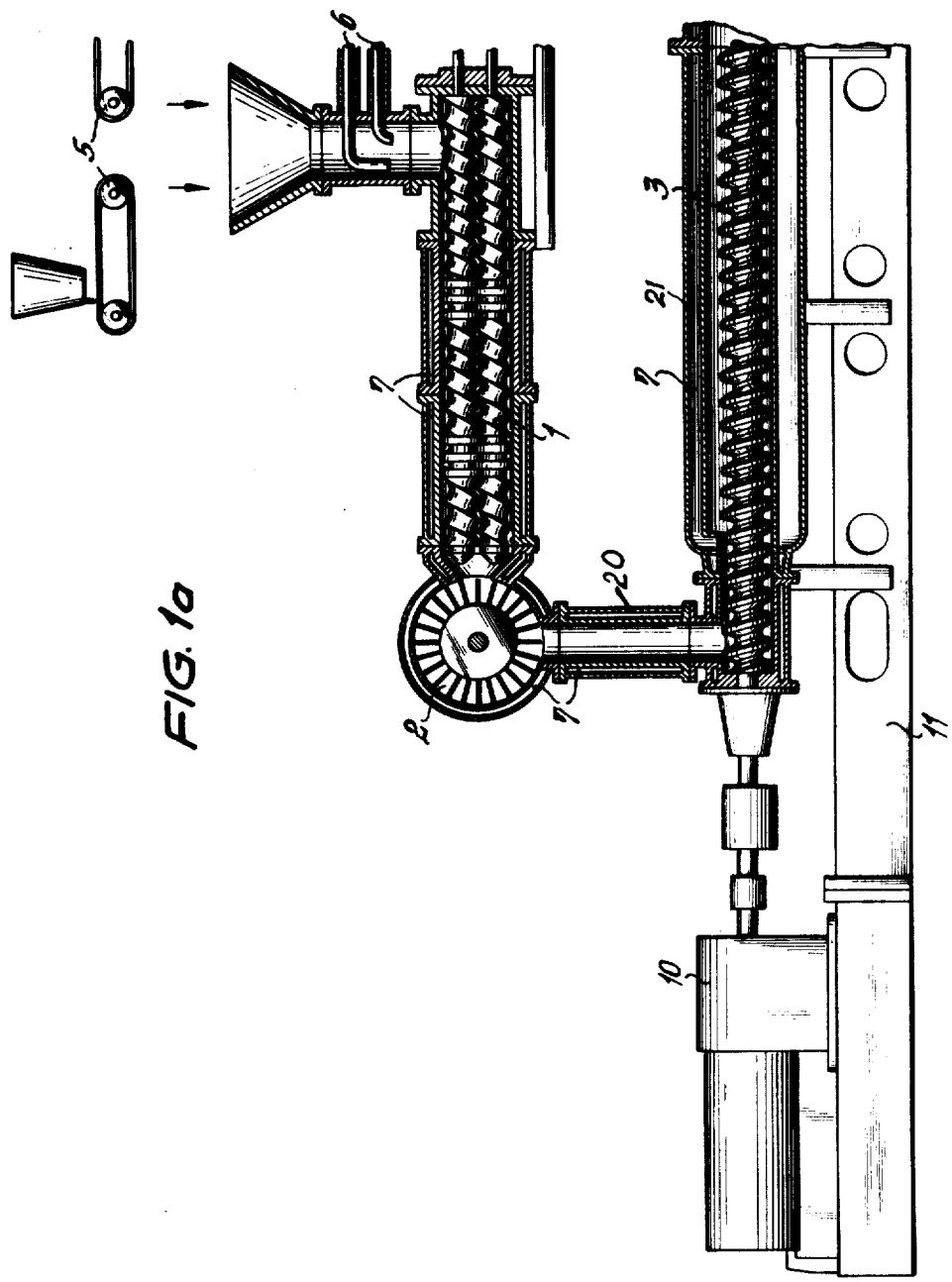
Figure 2:
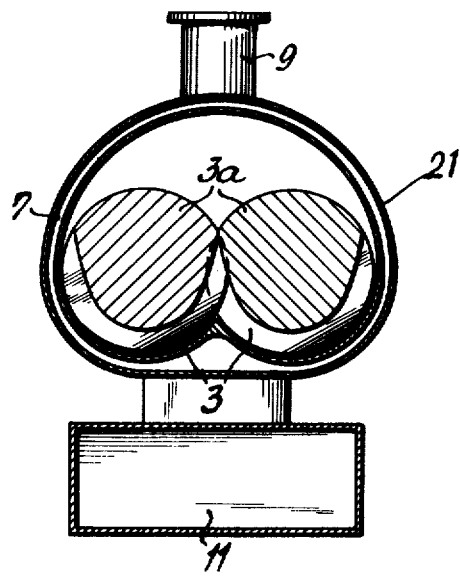
FIG. 2 is a diagrammatic section taken on line II—II of FIG. 1b.

Referring now to FIGS. 1a, 1b and 2 more in detail, the exemplified device comprises a two-worm mixing and kneading conveying device 1 of conventional design. The required solid or liquid ingredients of the mass of chocolate to be produced are fed into conveyor 1 by suitable metering means 5 shown as conventional band type dosing devices and pipes 6 in accurately controlled proportions. The ingredients to be mixed and kneaded may be finely granulated before being fed into conveyor 1.

The mixing and kneading conveyor is preferably equipped with heating and/or cooling means and is provided to this end with ducts and cavities 7 as is also a second conveyor 3 connected to conveyor 1 as will be more fully described hereinafter.

Treatment in mixing and kneading conveyor 1 produces a uniform and homogeneous starting mixture containing the different ingredients in proportions as required by the selected recipe. This mixture is immediately fed into a liquefying device 2 provided at the discharge end of conveyor 1. The liquefying device is shown as a conventional pump having radially disposed vanes; other conventional types of liquefiers such as a gear pump or a screw pump may also be used.

Pump 2 is rotated at a high speed and applies shear forces to the mixture therein. As a result, a liquefication of the mixture, that is, a mixture which has a very low viscosity is obtained. A mixture having a comparable low viscosity could be obtained only by providing extremely long worms in conveyor 1. Moreover, a high vacuum must be simultaneously applied which is costly and also causes a loss of many components desirable in this stage of the operation. Low viscosity of the mixture is absolutely necessary as otherwise the mixture cannot be conveyed in a continuous and finely distributed flow between and along the worms of the second or final conveyor 3 which is shown (Fig. 2) as having two meshing worms 3a and is connected at its feed end (left-hand end) to the discharge of pump 2 by conduits 20. The mass while passing through conveyor 3 experiences degasification and dehydration and also refining or upgrading as it occurs in a conventional conching operation. Treatment in a conveyor such as conveyor 3 takes about 20 to 30 minutes.

The finished mass when reaching the discharge end 8 of the conveyor has still a liquid or low viscous consistency and can now be fed directly to a storage receptacle (not shown) or means for shaping (not shown) the mass, for instance in the form of chocolate bars.

The casing 21 of worm conveyor 3 is not completely filled with the mass of chocolate. A filling of about two-thirds capacity is customary.

Degasification may be effected via one of several ports or studs 9 on the casing of the conveyor leading into the interior thereof.

Figure 3:
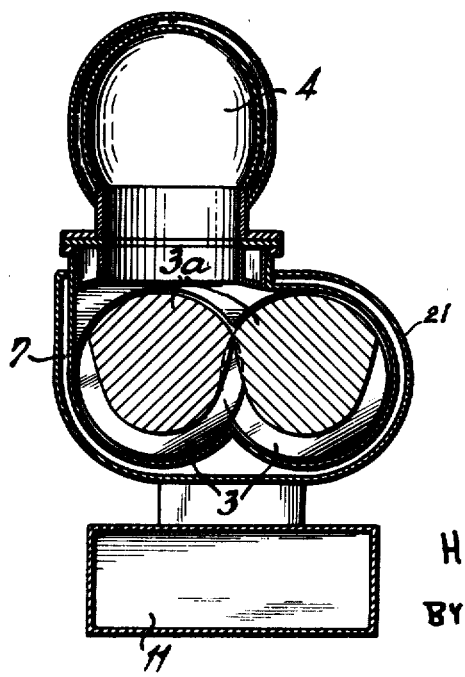
FIG. 3 is a section similar to FIG. 2, but showing a modification of the means for degasifying the mass of chocolate while passing through a conveyor included in the device.

Instead of using one or several ports or studs 9, a dome 4 can also be provided on casing 20 as shown in Fig. 3. This dome preferably extends along the entire length of the casing in communication with the interior thereof. A suitable evacuation port or stud (not shown) should be visualized as communicating with dome 4.

The studs or ports either on the casing or on the dome should be visualized as being connected to a suitable source of vacuum.

Treatment in worm conveyor 3 can be effected in several stages. To this end, the ports or studs leading into the casing of conveyor 3 or into dome 4 may be connected to differently strong vacua. In any event, no hard vacuum should be used to avoid the loss of valuable aroma essences which would be carried away together with sucked-off air or water vapor if a hard vacuum would be used.

The drive for conveyor 3 is diagrammatically indicated at 10 and the drive for conveyor 1 at 12. The entire device is mounted on a suitable foundation or bed indicated at 11.

What is claimed is:

1. A device for producing a mass of chocolate in continuous operation, said device comprising in combination:
- a first worm type conveying means for mixing and kneading ingredients suitable for producing a mass of chocolate to obtain an intimate and uniform mixture of said ingredients;
- liquefying means for liquefying said mixture connected to the discharge end of said conveying means;
- a multiple-worm second conveying means for conveying the liquefied mixture between and along the worms of said second conveying means to effect dehydration of the mixture, said second conveying means being connected at its inlet end to the discharge end of the liquefying means; and
- degasifying means associated with said conveyor means for degasifying the mixture while being conveyed along the worms thereof.

2. The device according to claim 1 wherein said liquefying means comprises a gear pump.

3. The device according to claim 2 wherein said liquefying means comprises a screw pump.

4. The device according to claim 1 wherein said liquefying means comprises a pump having radially disposed vanes.

5. The device according to claim 1 wherein said liquefying means comprises a mechanical mill.

6. The device according to claim 1 and comprising an elongate casing, said worms of the second conveying means being rotatably mounted in said casing parallel to the lengthwise axis thereof, and said casing including a port for connecting the interior of the casing to a source of vacuum.

7. The device according to claim 1 and comprising an elongate casing, said worms of the second conveying means being rotatably mounted in the casing parallel to the lengthwise axis thereof, and a dome extending the length of said casing on the outside thereof and in communication with the interior of the casing, said dome having a port for connection to a source of vacuum.

8. The device according to claim 1 wherein the second conveying means comprises an elongate casing, at least two worms of the conveying means being in mesh and rotatably supported in said casing in mutually parallel relationship to each other and the casing.

* * * * *